United States Patent
Corti

(10) Patent No.: US 7,614,780 B2
(45) Date of Patent: Nov. 10, 2009

(54) METHOD AND APPARATUS WITH LOBED NOZZLES, FOR MIXING REACTIVE CHEMICAL COMPONENTS

(75) Inventor: Maurizio Corti, Como (IT)

(73) Assignee: Afros S.p.A., Caronno Pertusella (VA) (IT)

( * ) Notice: Subject to any disclaimer, the term of this patent is extended or adjusted under 35 U.S.C. 154(b) by 72 days.

(21) Appl. No.: 11/763,479

(22) Filed: Jun. 15, 2007

(65) Prior Publication Data

US 2008/0094936 A1    Apr. 24, 2008

(30) Foreign Application Priority Data

Jun. 21, 2006   (IT) ................ MI2006A1195

(51) Int. Cl.
*B01F 5/04* (2006.01)
*B29B 7/76* (2006.01)
(52) U.S. Cl. .............. 366/162.5; 239/498; 422/133
(58) Field of Classification Search ........... 366/138, 366/159.1, 162.4, 162.5, 167.1, 173.1; 422/131, 422/133–135; 239/402.5, 403, 477, 487, 239/498, 500, 590.3
See application file for complete search history.

(56) References Cited

U.S. PATENT DOCUMENTS

| | | | |
|---|---|---|---|
| 2,775,482 A * | 12/1956 | Schutz | ................ 239/398 |
| 4,332,335 A | 6/1982 | Fiorentini | |
| 4,889,287 A * | 12/1989 | Hemsley et al. | ............. 239/498 |
| 5,093,084 A * | 3/1992 | Boden et al. | ............. 366/162.5 |
| 5,444,124 A | 8/1995 | Schlund et al. | |
| 5,664,733 A | 9/1997 | Lott | |
| 7,455,446 B2 * | 11/2008 | Corti et al. | ............... 366/162.5 |
| 2008/0094936 A1 * | 4/2008 | Corti | ...................... 366/162.4 |

FOREIGN PATENT DOCUMENTS

| | | | |
|---|---|---|---|
| EP | 80698 A2 * | 6/1983 | |
| EP | 0 162 130 | 11/1985 | |
| EP | 271803 A2 * | 6/1988 | |
| EP | 513938 A2 * | 11/1992 | |
| JP | 01316221 A * | 12/1989 | |

\* cited by examiner

*Primary Examiner*—Charles E Cooley
(74) *Attorney, Agent, or Firm*—Young & Thompson

(57) ABSTRACT

A method and an apparatus for high-pressure mixing of reactive chemical components. The chemical components are fed into a mixing chamber, by respective injectors at least one of which comprises a nozzle and a plug member for controlling the pressure drop; the nozzle and/or the plug member are shaped to form a lobed outlet orifice having an adjustable outlet cross section and a plurality of radially extending lobed formations, to create a vortical or swirling and highly turbulent state in the fluid jet. The surfaces in contact with the fluid of the nozzle and/or of the plug member can either be smooth or have sharp edges which contribute to increase the turbulence and swirling state of the fluid jet; a highly effective mixing degree is thereby achieved in the manufacture of polyurethane resins, bi-component resins and molded articles.

24 Claims, 7 Drawing Sheets

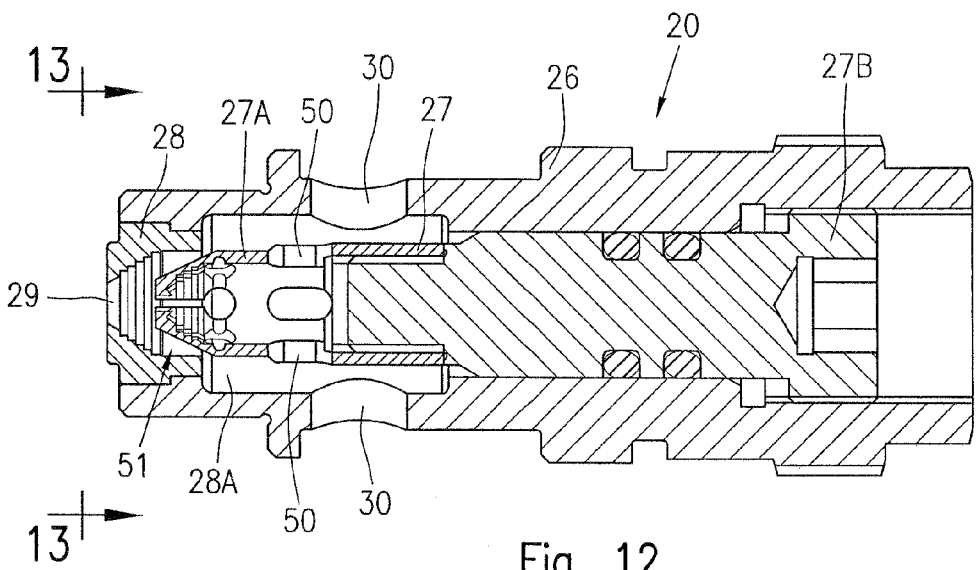
Fig. 12
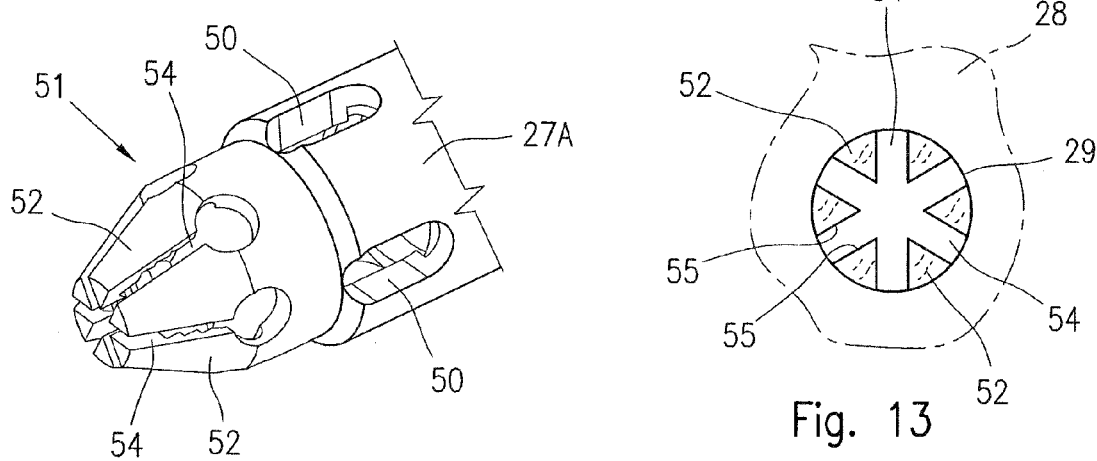
Fig. 14
Fig. 13
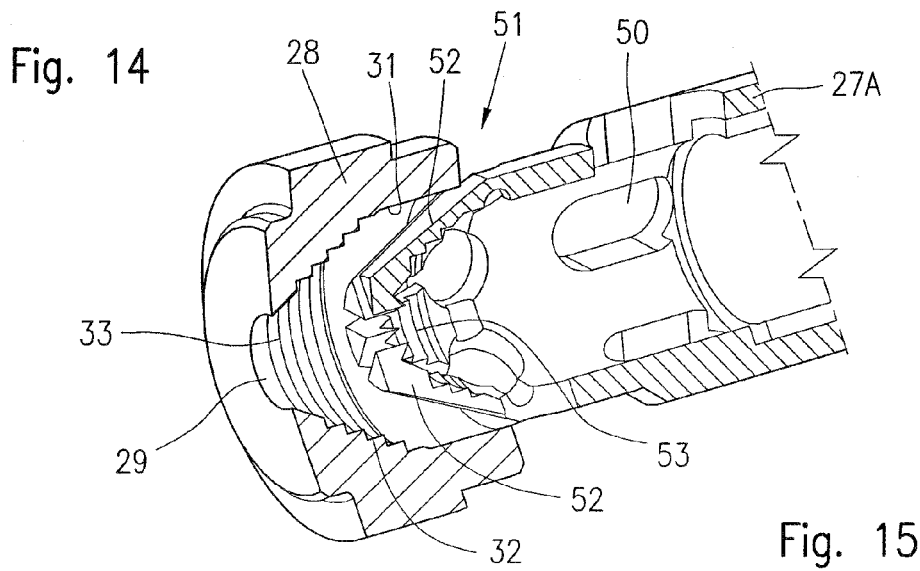
Fig. 15

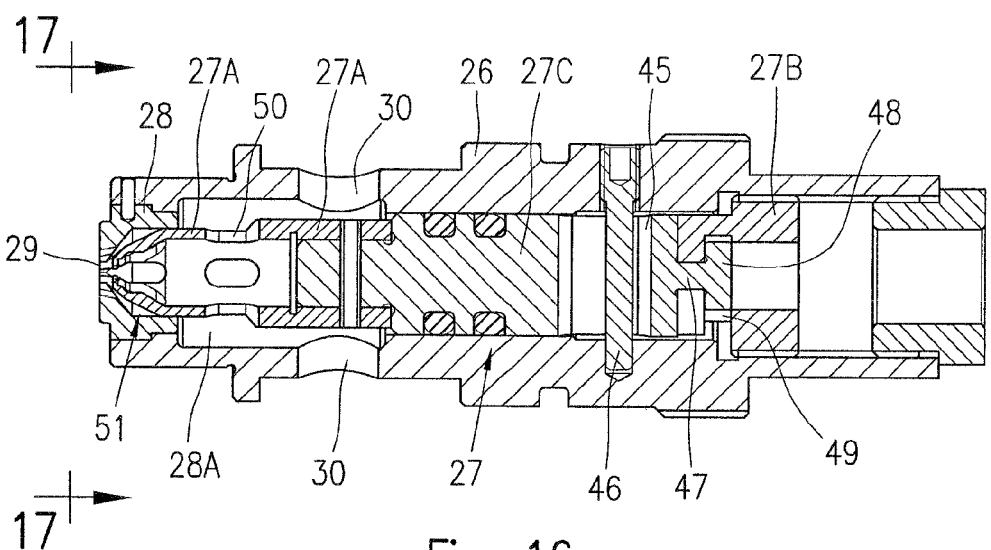
Fig. 16
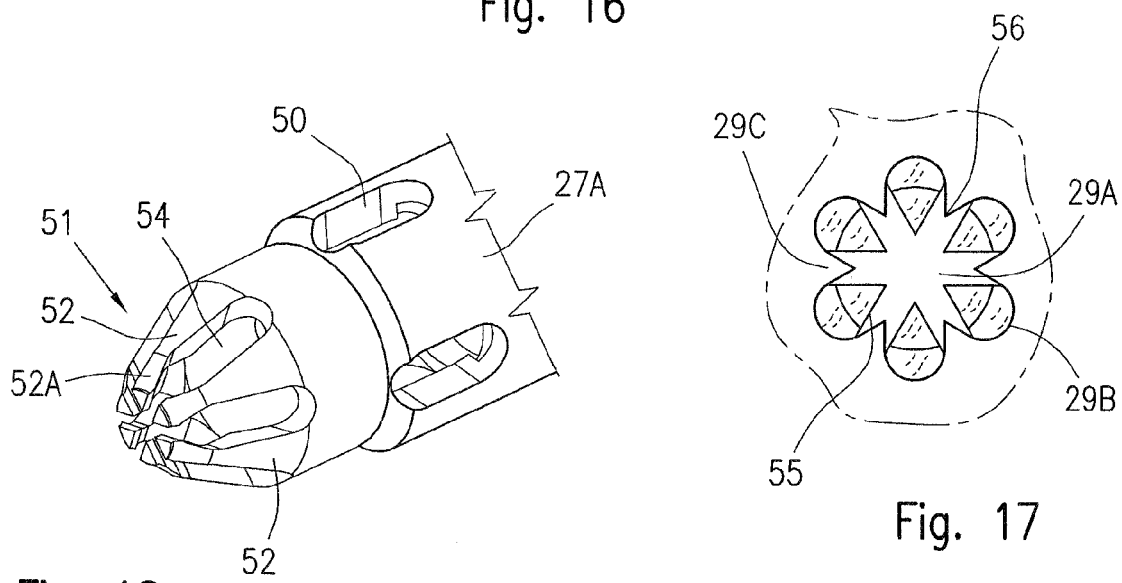
Fig. 18
Fig. 17
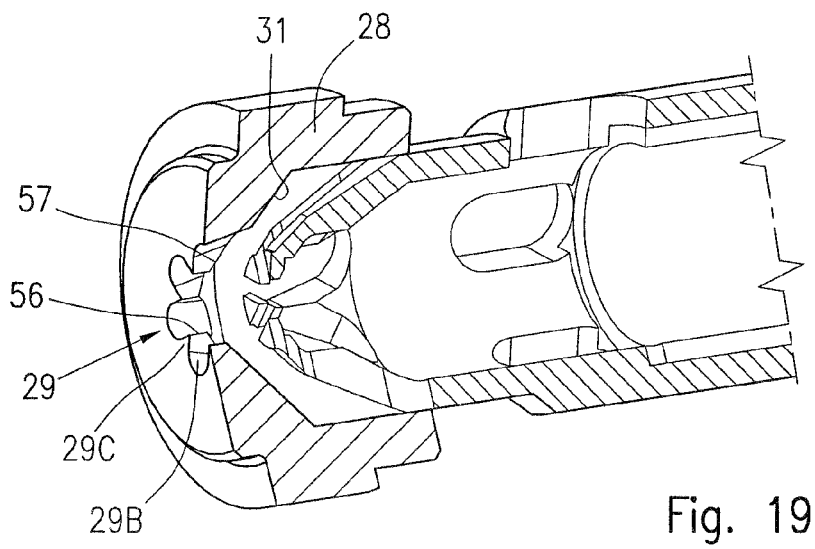
Fig. 19

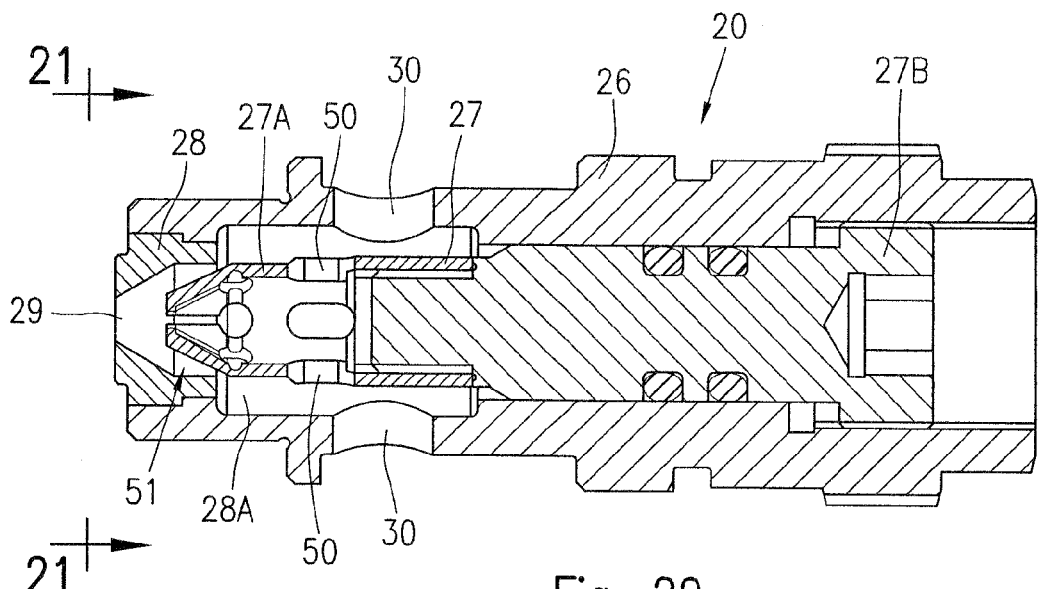
Fig. 20
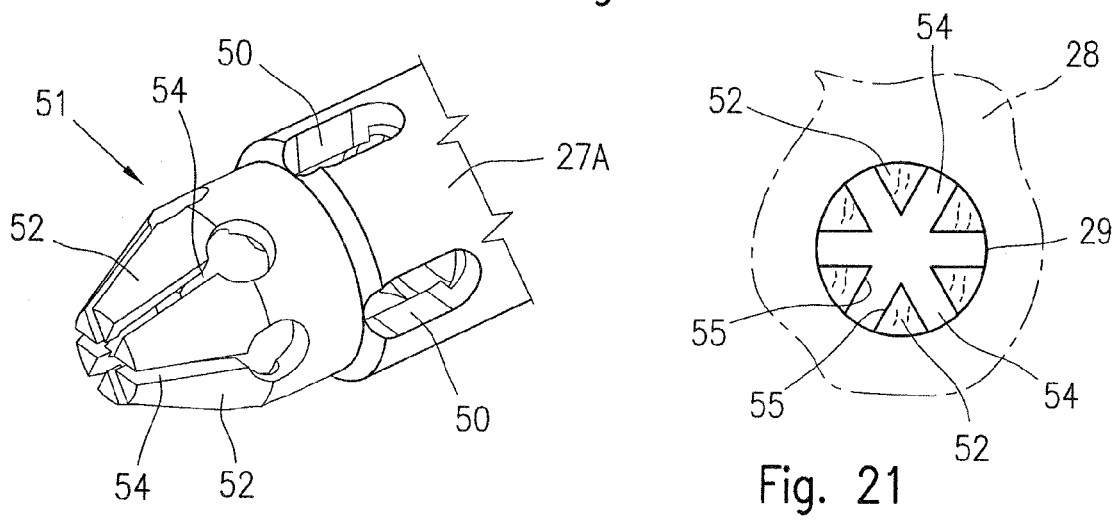
Fig. 22
Fig. 21
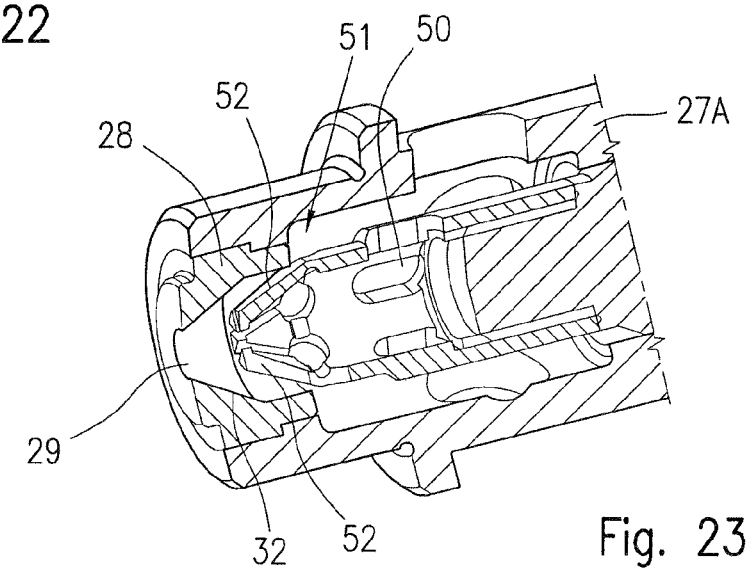
Fig. 23

METHOD AND APPARATUS WITH LOBED NOZZLES, FOR MIXING REACTIVE CHEMICAL COMPONENTS

BACKGROUND OF THE INVENTION

This invention refers to a method and an apparatus for mixing liquid chemical components which are fed under pressure conditions and which are capable of reacting with one another for the manufacture of polyurethane resins, bi-component resins and molded articles; according to the invention positive use is made of the turbulence and the vorticity or swirling induced by the injection, and by the impingement of jets of the chemical components in a mixing chamber, through specific injectors appropriately conformed, to provide a methodology tending to improve the mixing processes as compared to those carried out with conventional injectors.

DESCRIPTION OF THE RELATED ART

Field of the Invention

In the manufacture of polyurethane resins, bi-component resins, or molded articles of rigid or flexible plastic material, two or more reactive chemical components, with foaming agents and/or additives, are mixed in appropriate mixing apparatuses according to conventional methodologies; the resulting reactive mixture is injected into a mold, or poured onto a substrate, where rapidly reacts to form a polyurethane foam or an elastomeric material, for example in the manufacture of panels and molded articles.

There are two known basic mixing techniques, and namely: a first mixing methodology, referred to as low pressure mixing, consists in feeding the chemical components at a low-pressure in the range of a few dozen bars or less, into a mixing chamber where they are thoroughly mixed by the mechanical action of an impeller.

According to another mixing methodology, so-called "by impingement", or "high-pressure" mixing, the chemical components are fed at high pressures, equivalent to or higher than 100-150 bar (10-15 MPa) and separately injected, or pre-mixed, into a mixing chamber with such high speed and kinetic energy as to cause their mixing by the eddying and swirling of the flows, after the jets of the components have crossed one another in a colliding area.

The known high-pressure mixing apparatuses consequently provide for a separate feeding and injection of the individual chemical components into a mixing chamber, through usual injection nozzles shaped in such a way as to convert the high pressure energy with which the individual chemical components are fed, into a correspondingly high kinetic energy of the jets. High-pressure mixing apparatuses are described for example in U.S. Pat. No. 4,332,335, and EP 0,162,130.

In the past, attempts have been made to improve the efficiency of high-pressure mixing by adopting increasingly higher pressure values for feeding the individual components, or by using throttling members for choking the outlet aperture of the mixing chamber, or post-mixing devices, all of which tend to functionally and structurally complicate the apparatus.

Whenever it is necessary to mix chemical components which are highly viscous, or incompatible with one another from the standpoint of their solubility and miscibility, such as for example a hypophilic component and a hydrophilic component, usually very high feeding pressures must be used to achieve the desired turbulence and mixing, with a consequent greater energy consumption, and greater structural and functional complications for the entire installation.

The same remarks apply for mixing small volumes, typically below 80 cc/sec, up to 1 or 2 cc/sec, where according to Reynolds well-known studies on turbulence, the use of small volumes and small ducts makes it extremely difficult to establish and maintain a sufficiently turbulent condition of the fluids.

It is likewise known that an injector consists in a device provided with a specific nozzle capable of generating a fluid jet with a high speed, in a given direction, downstream of an outlet orifice having a narrow cross-sectional area for the passage of the fluid flow. In general, the nozzle has an internal surface in contact with the fluid, which progressively narrows towards an outlet hole, or orifice, so as to generate in the fluid flow an increase in the velocity determined by the pressure energy which progressively decreases, so as to generate a high-speed flow for the purpose that a given application intends to achieve.

The use of lobed nozzles simply provided with a plurality of peripheral lobes which extend in a radial direction from a central area, was suggested in the past by U.S. Pat. No. 5,444,124 and by U.S. Pat. No. 5,664,733 for different applications, and for the sole purpose of improving the dispersion of solid and liquid particles in a fluid, as they are discharged from the same nozzle. According to these solutions, the nozzle has an orifice having a fixed outlet cross section, and therefore does not require and allow any adjustment.

The use of lobed nozzles devoid of adjustment, has also been suggested for feeding fuel mixtures into combustion chambers of injection engines; see for example "Fluid Physics" published by the American Institute of Physics, volume no. 13 dated Nov. 11, 2001 and the AIAA Journal, vol. no. 41 dated Apr. 4, 2003.

The lobed nozzles of the aforementioned type therefore merely have a central area for the outlet of the fluid, and a plurality of lobes or radial lobes delimited by smooth internal surfaces. The pressure drop and the dynamic characteristics of the jet consequently must be pre-established, since they are depending exclusively by the cross-sectional area of flow passage, without any possibility of varying them or adjusting except by changing the flow rate of the fluid.

Lobed nozzles of the aforementioned type have consequently proved to be wholly unsuitable for use in the high-pressure mixing of reactive chemical components, in the manufacture of polyurethane or bi-component resins, where pre-established flow rates are generally required for each injection and, however, must be adjusted at each production change and for which it is important to change and adapt the feeding pressure or the pressure drop generated by the nozzle and the dynamic characteristics of the jet, in relation to the flow rate of the fluid, in order to find the best mixing conditions.

In fact, from tests and experiments carried out it has been noted that the surface vorticity caused by the simple subdivision of the flow of an usual lobed nozzle of the type previously referred to, and the lack of a suitable adjusting system to change the flow rate, have proved to be insufficient for appropriately adjusting and improving the mixing efficiency in conventional high-pressure mixing apparatuses, in which the presence of a powerful turbulence state in the jets, proves to be an essential condition for obtaining thorough mixing.

BRIEF SUMMARY OF THE INVENTION

There is consequently a need to further improve the methods and high-pressure mixing apparatuses of conventional type for mixing chemically reactive components, in particular in the manufacture of polyurethane or bi-component resins and molded articles.

Therefore, one object of this invention is to provide a method and a high-pressure mixing apparatus by means of which it is possible to increase the state of vorticity in the jets of the individual injection nozzles, and the turbulence in an impingement zone of a mixing chamber, and to appropriately adjust and set the conditions for narrowing the cross-sectional area of the nozzles so as to increase the mixing efficiency.

A further object of the invention is to provide a high-pressure mixing apparatus, for mixing reactive chemical components, capable of achieving the aforementioned result by a simple solution which is easily adaptable to different requirements of use, to correlate them with established flow rates.

According to a first aspect of the invention a method has been therefore provided for high-pressure mixing of chemically reactive fluid components, for the manufacture of polyurethane resins, bi-component resins and molded articles, comprising:

pressure feeding flow rates of a first and at least a second fluid component to a respective injection device comprising an injection nozzle and a drop-pressure control plug member, i.e., needle, said injection nozzle and said needle having facing surfaces to contact the fluid narrowing towards an outlet orifice for the discharge of a fluid jet;

injecting the fluid jet of each chemical component into a mixing chamber of a mixing device where the chemical components are thoroughly mixed by turbulence and impingement:

conforming the injection nozzle and/or the needle, to provide a lobed orifice for discharging the fluid jet;

adjusting the operative position of the needle with respect to the injection nozzle to provide a lobed outlet orifice having a narrowing cross-sectional area related to the flow rate of the chemical component to cause a pre-established pressure drop in the jet; and generating a vortical or swirling and highly turbulent condition into the fluid jet, conforming the fluid jet with a plurality of radially extending lobate formations as it flows through said lobed orifice.

According to a further aspect of the invention, an injector has been provided for feeding a chemically reactive fluid component into a mixing chamber of a mixing device, for the manufacture of polyurethane resins, bi-component resins and molded articles, comprising:

a hollow body defining a flow path for the component between a fluid inlet and an outlet hole of an injection nozzle;

a needle coaxially extending in the injection nozzle for controlling the pressure drop, said nozzle and said needle having facing surfaces to contact the fluid, narrowing towards the outlet hole of the nozzle, wherein said fluid-contact surfaces of the nozzle and/or of the needle are conformed to provide a lobed outlet orifice having a central area and a plurality of peripheral lobes dividing or providing lobate formations in the fluid jet, which radially extend from said central area of the lobed orifice.

According to possible embodiments, the nozzle and/or the needle for controlling the pressure drop can have facing surfaces in contact with the fluid, provided with serrations or sharp edges for the purpose of increasing the swirling condition and turbulence in the fluid jet downstream the injection nozzle.

According to the invention, the needle can be in the form of a rod having either a solid cross section, or a hollow cross section ending with a plurality of elastically yieldable longitudinal tongues, to change the outlet cross section of the lobed orifice of the injection nozzle, by appropriately adjusting the axial position of the aforesaid control plug in respect to the nozzle, to provide a required feeding pressure co-related to a pre-established flow rate.

According to a still further embodiment of the invention, a high-pressure mixing apparatus has been provided for mixing chemically reactive fluid components for the manufacture of polyurethane resins or bi-component resins, and molded articles, comprising:

a first and at least a second injector for feeding chemical components into a mixing chamber;

in which at least one of the injectors comprises a hollow body and a nozzle defining a flow path for the fluid between an inlet and an outlet side;

an axially movable control plug member for adjusting the pressure drop;

said nozzle and said needle having opposite surfaces to contact the fluid, narrowing towards an outlet orifice having a flow cross-section orientated in the direction of a longitudinal axis, wherein the nozzle and/or the needle are conformed to provide the lobed outlet orifice for the fluid, said lobed orifice comprising a central zone and a plurality of lobes radially extending from said central zone.

Optionally, the nozzle and/or the needle for controlling and adjusting the pressure drop are provided with a plurality of sharp edges, which extend in a cross direction and/or in the direction of a longitudinal axis of the nozzle, in correspondence with said fluid-contact surfaces.

BRIEF DESCRIPTION OF THE DRAWINGS

These and further features of the method, the injector and the apparatus according to this invention, will be more clearly evident from the following description, with reference to the accompanying drawings, in which:

FIG. 12 shows a longitudinal cross-sectional view of a third embodiment of an injector provided with a lobed nozzle according to the invention;

FIG. 13 shows an enlarged front view, along the line 13-13 of FIG. 12;

FIG. 14 shows an enlarged perspective view of the fore side of the plug member for adjusting the pressure drop;

FIG. 15 shows a partially enlarged cross-sectional perspective view of the nozzle and the needle;

FIG. 16 shows a longitudinal cross-sectional view of a fourth embodiment of an injector provided with a lobed nozzle according to the invention;

FIG. 17 shows a front view along the line 17-17 of FIG. 16;

FIG. 18 shows an enlarged perspective view of the fore side of the needle for adjusting the pressure drop;

FIG. 19 shows a partially enlarged cross-sectional perspective view of the nozzle and of the needle.

FIG. 20 shows a longitudinal cross-sectional view of a fifth embodiment of an injector with a lobed nozzle according to the invention;

FIG. 21 shows a front view along the line 21-21 of FIG. 20;

FIG. 22 shows an enlarged perspective view of the fore side of the needle for adjusting the pressure drop;

FIG. 23 shows a partially enlarged cross-sectional perspective view of the nozzle and of the needle.

DETAILED DESCRIPTION OF THE INVENTION

Figure 1:
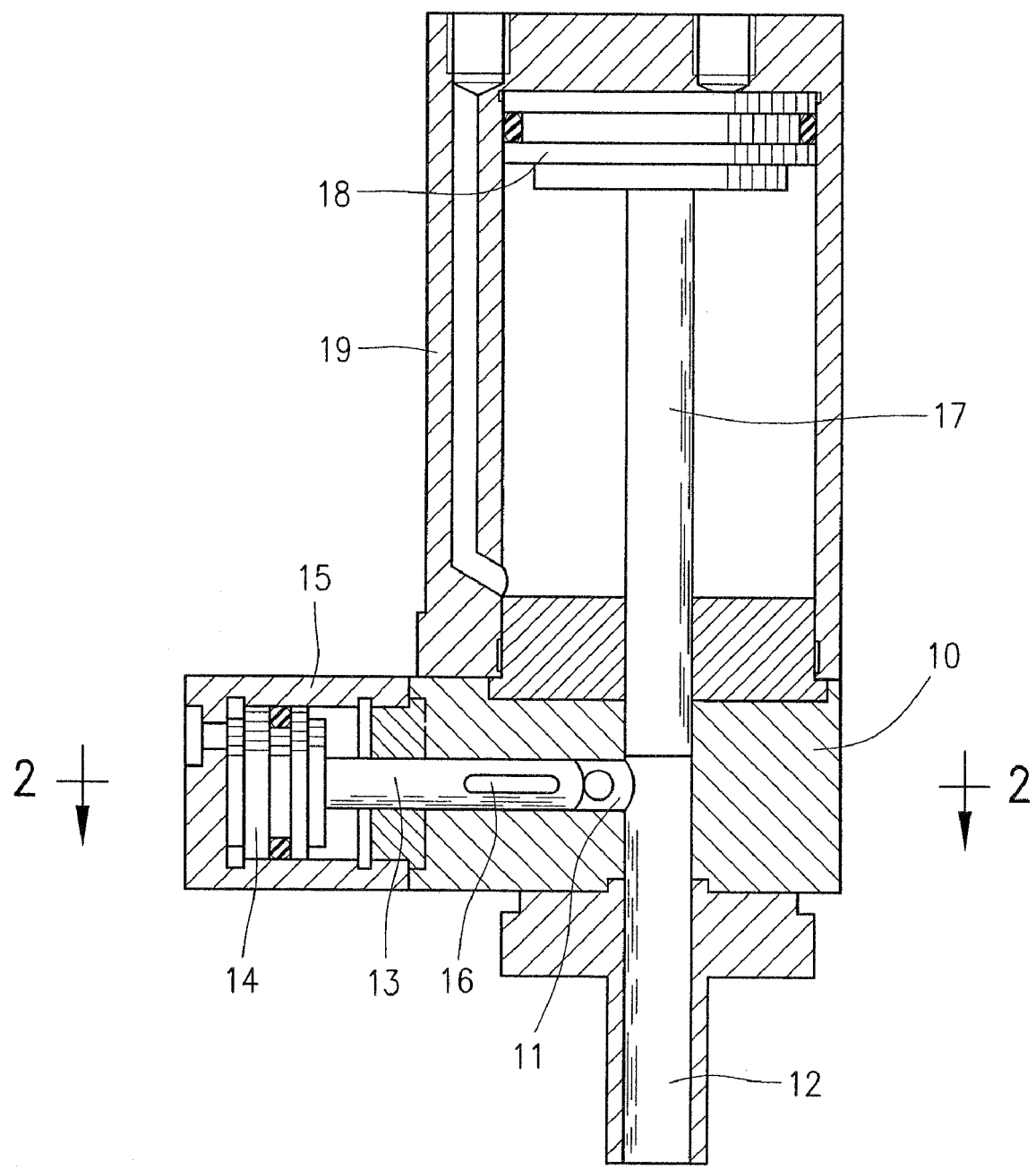
FIG. 1 shows a longitudinal cross-sectional view of a high-pressure mixing apparatus provided with lobed nozzles according to the invention.
Figure 2:
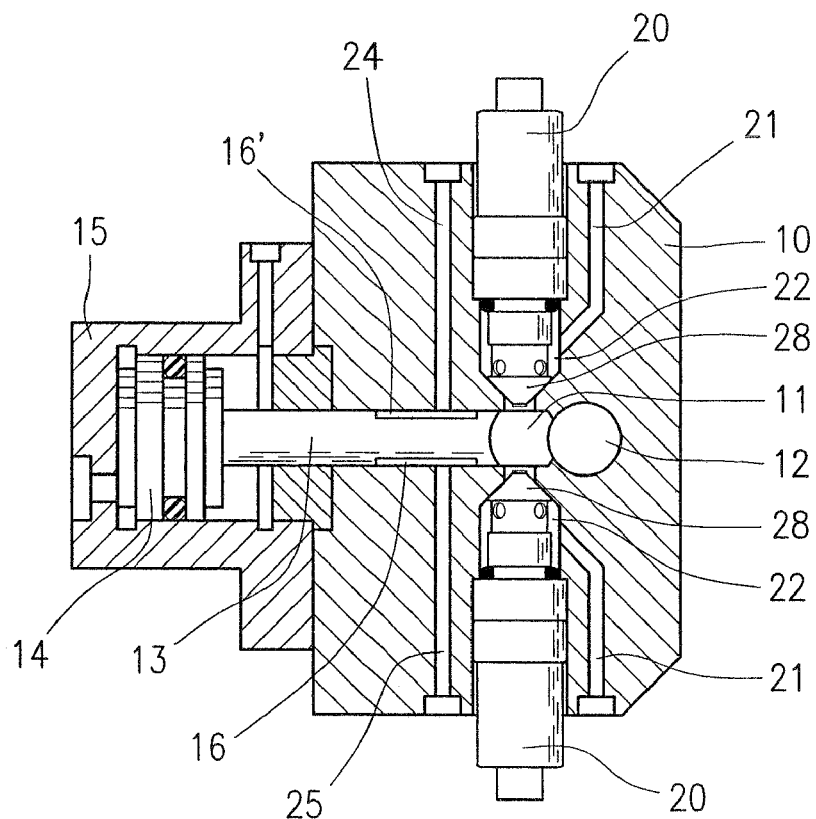
FIG. 2 shows a cross-sectional view along the line 2-2 of FIG. 1.

FIGS. 1 and 2 show a high-pressure mixing device for mixing reactive chemical components, of the self-cleaning type, for the manufacture of molded or foamed articles of polyurethane material or bi-component resins, for example of the type shown in U.S. Pat. No. 4,332,335. The mixing device comprises a casing 10 having a mixing chamber 11 which opens out towards a delivery duct 12.

In the case shown, the duct 12 for delivery the resulting mixture is disposed at right angles to the axis of the mixing chamber 11; however, different solutions are possible such as for example an axially aligned disposition of the mixing chamber and the delivery duct, or other configurations.

Inside the mixing chamber 11 a first cleaning member 13 is slidably movable, the cleaning member 13 substantially consisting of a cylindrical needle connected to the piston 14 of a first hydraulic control cylinder 15; in a per se known way, the needle 13 comprises longitudinal slots 16, 16' for the recycling of the individual chemical components.

The mixing device comprises also a second cleaning member 17 for cleaning the delivery duct 12, again consisting of a cylindrical needle connected to the piston 18 of a second hydraulic control cylinder 19.

Pre-established flow rates, variable in relation to the pressure required for the individual chemical components to be mixed, are injected into the mixing chamber 11 by respective injectors 20, two in the case shown, which are radially oriented in respect to the mixing chamber to allow the jets of the components to collide in a highly vortical or swirling and turbulent condition, for intimate mixing. The chemical components are fed to the individual injectors 20, by feeding ducts 21 which open out towards respective annular chambers 22; the individual chemical components can be made to flow back to their respective tanks by the recycling slots 16, 16' in the cleaning member 13, and return ducts 24 and 25 in a per se known way.

As previously mentioned, in order to obtain a high turbulence and a high mixing degree of the chemical components, according to this invention use is suggested of a particular injector 20 provided with a lobed nozzle having an outlet orifice and a needle comprising, in a narrowed section of the nozzle, flow contact surfaces for the fluid variously shaped to control and adjust the pressure drop, as well as to increase the extension of said contact surface to induce further vorticity and turbulence in the jet. The nozzle and/or the needle can either have smooth surfaces or comprising a plurality of sharp edges designed to create a condition of high turbulence in the fluid, while at the same time maintaining the needle axially movable to adjust the pressure drop in the fluid flowing through the aforesaid injection nozzle.

A first embodiment of a lobed injector, according to the invention, is shown in figures from 3 to 7 of the accompanying drawings.

Figure 3:
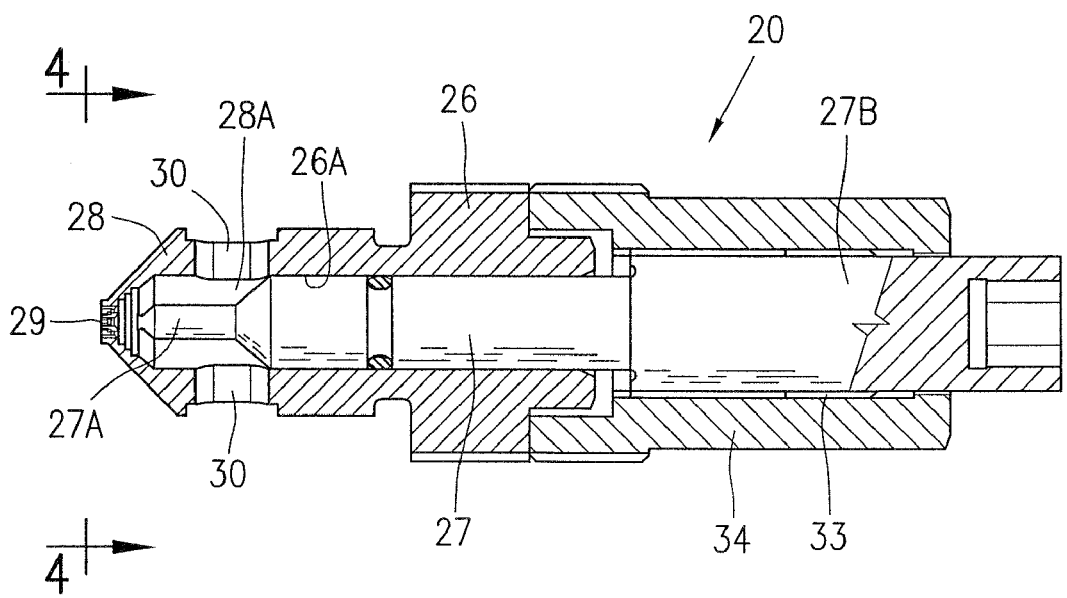
FIG. 3 shows a longitudinal cross-sectional view of a first embodiment of an injector provided with a lobed nozzle according to the invention.

In FIG. 3 the injector 20 comprises a hollow body 26 having a longitudinal guide hole 26A for axially movable needle 27 conformed for controlling the pressure drop in the fluid; for sake of clarity, the needle 27 in the various figures has been shown in a backward position with respect to the nozzle of the injector. The guide hole 26A ends at its fore end in a nozzle 28 provided with an axial bore 29 for adjusting the fluid jet fed into the mixing chamber 11 of a mixing device; reference number 30 in FIGS. 2 and 3 has been used to indicate lateral inlet apertures for the chemical component into the nozzle 28.

Figure 5:
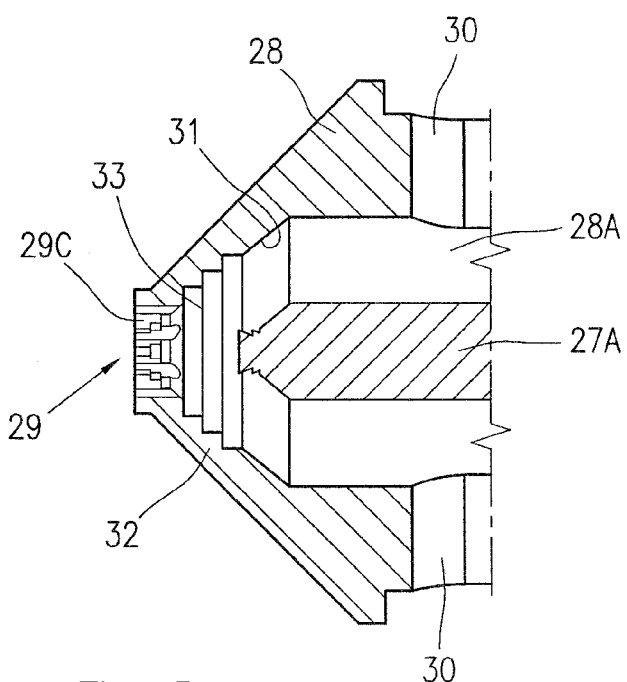
FIG. 5 shows an enlarged detail of the lobed nozzle of FIG. 3.

The nozzle 28, as shown in FIG. 3 and in the enlarged detail of FIG. 5, has a conical inner surface 31 to contact the fluid, which converges towards the outlet hole 29; the fluid-contact surface 31 of the nozzle, in combination with a fluid-contact surface at the fore end 27A of the plug, i.e., needle 27, form an outlet orifice having a narrowed cross-sectional area, which progressively restricts the flow passage for the fluid towards the outlet hole 29 so as to generate, through the narrowed passage of the aforesaid nozzle, both a pressure drop, and a fluid flow at high speed, in the direction of the restriction of the hole 29. In the case of FIGS. 3 and 5, the nozzle 28 is integral with or made in one piece with the body 26 of the injector, however, it could be made as a separate interchangeable part for a same injector.

Figure 6:
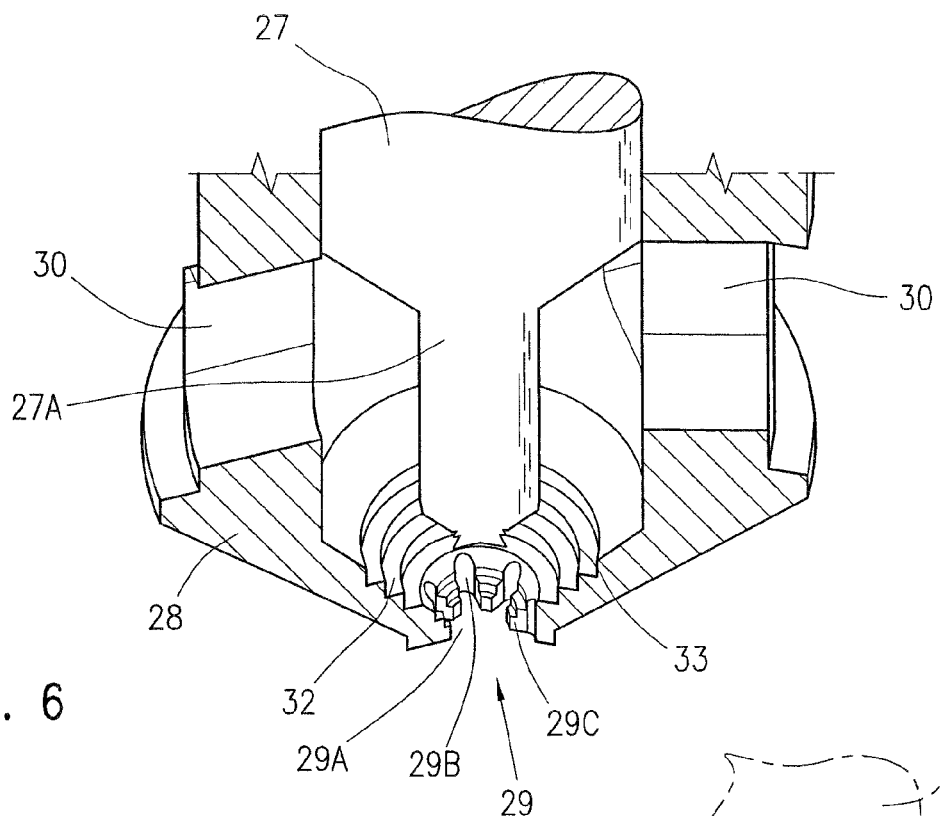
FIG. 6 shows an enlarged cross-sectional perspective view of the injection nozzle.
Figure 4:
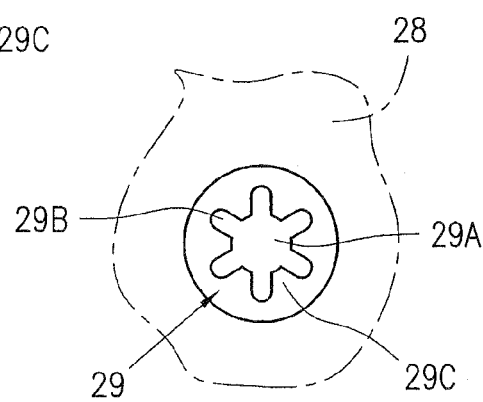
FIG. 4 shows an enlarged front view, along the line 4-4 of FIG. 3.

As also shown in FIGS. 4, 5 and 6, the nozzle 28 is provided with an outlet hole 29 defining, together with the needle 27, a lobed orifice designed to conform and divide the outcoming flow of the chemical component into a plurality of partial flows, along a narrowed area of the injector; the lobed shape of the nozzle or more precisely of the outlet orifice divides the flow of the component into an axially directed central flow, and into a plurality of radial lobate formations provided by lateral flows, but lying in radial planes, thereby making it possible to increase the turbulence condition in the central part of the jet and of the same time creating further vortexes.

More precisely, as shown in the example of FIG. 4, the outlet hole 29 of the nozzle comprises a circular central zone 29A, and a plurality of lobes or peripheral lobes 29B which extend in a radial direction from the central zone 29A.

The lobes 29B are separated by a number of teeth 29C which, in correspondence with the hole 29, extend in a radial direction as far as the central zone 29A. The teeth 29C can have smooth surfaces in contact with the fluid stream; however, preferably, as shown in the enlarged detail of FIG. 6, the teeth 29C may be made with steps and sharp edges 29D oriented either parallel to and/or crosswise the longitudinal axis of the fluid flow through the nozzle, again for the purpose of increasing the turbulence condition induced in the jet.

According to another feature of the invention, the conical inner surface 31 of the nozzle designed to come into contact with the fluid, is preferably made with a plurality of annular steps 32, FIGS. 5 and 6, capable of providing a set of circular-shaped sharp edges 33 having a diameter gradually decreasing towards the outlet hole 29; alternatively, the steps 32 and the sharp edges 33 could even be missing.

The presence of the steps 32 inside the nozzle 28, with the relevant sharp edges 33, makes it possible both to increase the surface in contact with the fluid, compared to a conventional nozzle, and to cause deep "shearing" actions in the nappe at the outermost layer of the fluid stream flowing through the nozzle, and a consequent increase in the turbulence degree of the jet generated by the injector.

As is known, to allow adjustment of the pressure drop of the flow and increase its speed through the nozzle at any change of the fluid conditions, the injector comprises an axially adjustable needle 27, having a fore end 27A conformed to narrow, or widen, the cross-sectional area of the outlet orifice of the injection nozzle, depending upon the moving direction of the needle 27 for adjustment, to obtain the necessary pressure drop, in relation to the flow-rate, in order to generate the required speed and turbulence condition for the jet.

The axial adjustment of the needle 27 can be achieved in any appropriate way, also by means of automatisms; for example, as shown in FIG. 3, the needle 27 is provided with a rear control portion 27B having a thread 33 which can be screwed into an internally threaded bush 34 rearwardly extending from the body 26 of the injector.

According to another feature of the invention, it is possible to use physical elements protruding into the fluid stream inside the injector, to contribute to creation of an induced turbulence state.

Figure 7:
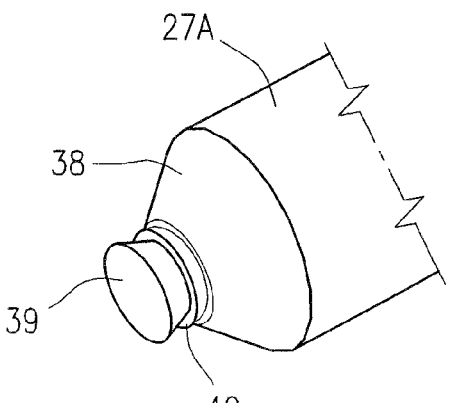
FIG. 7 shows an enlarged perspective view of the fore side of the plug member for adjusting the pressure drop.

This can be achieved by appropriately conforming the end portion 38 of the needle 27, with suitable surfaces or protrusions provided with sharp edges for shearing the fluid stream; for example, as shown in FIG. 7, the end portion 38 of the needle 27 can be provided with a conical nose 39, which diverges in the axial direction of the flow; the nose 39 is in turn provided with one or more circular-shaped steps having sharp edges 40; obviously, other solutions are possible compared to the one shown.

A second embodiment of the injector is shown in the example of figures from 8 to 11 of the drawings. In these figures the same references numbers as the previous figures have been used to indicate similar or equivalent parts, to which reference is made for a description of the general features of the injector.

In particular, in this second embodiment, the nozzle 28 comprises an inner conical surface 31 having a plurality of annular steps 32, which increase the extension of the fluid-contact surface and which have sharp edges 33 in contact with the fluid, compared to a conventional nozzle.

The embodiment of FIG. 8-11 differs from the preceding one due both to the different conformation of the teeth 29C of the lobed hole 29, and the different conformation of the tip 39 of the needle 27 for controlling the pressure drop; once again, the needle 27 is shown in a backward position with respect to the hole 29 of the nozzle 28.

As far as the lobed hole 29 is concerned, in this second case the teeth 29C have a smooth inner surface, devoid of steps and sharp cross edges; the teeth 29C have only sharp edges 40 which extend in the direction of the flow, parallel to the longitudinal axis of the nozzle, and sharp radial edges 41 on the conical inner surface resulting from the lobed or star shape of the hole itself.

Figure 8:
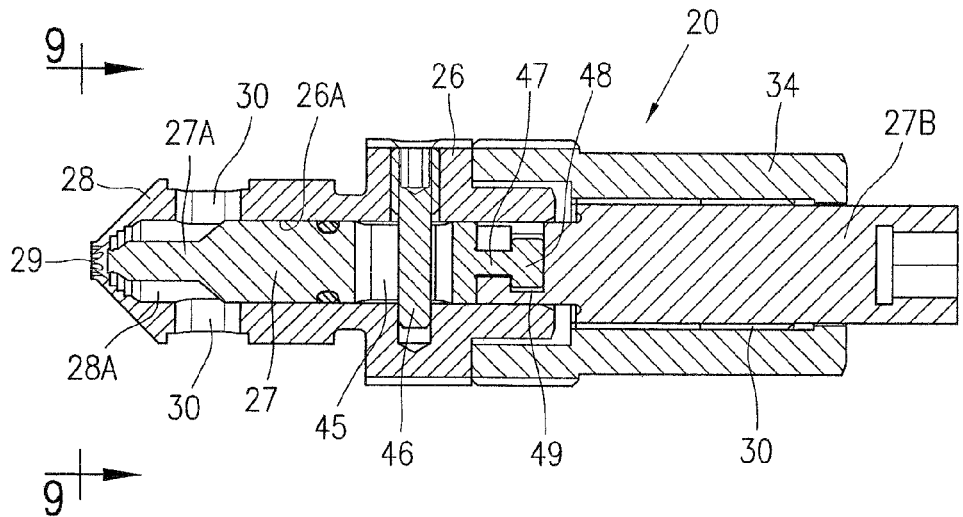
FIG. 8 shows a longitudinal cross-sectional view of a second embodiment of an injector provided with a lobed nozzle according to the invention.
Figure 9:
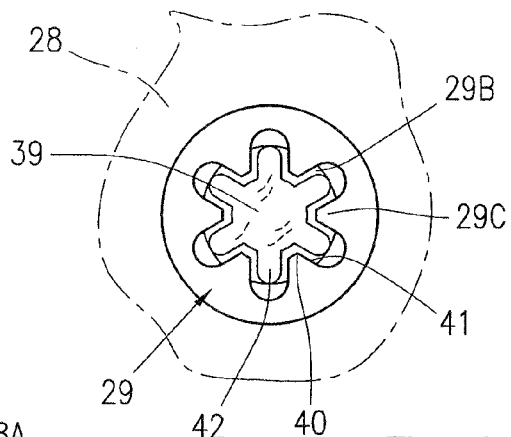
FIG. 9 shows an enlarged front view, along the line 9-9 of FIG. 8.
Figure 10:
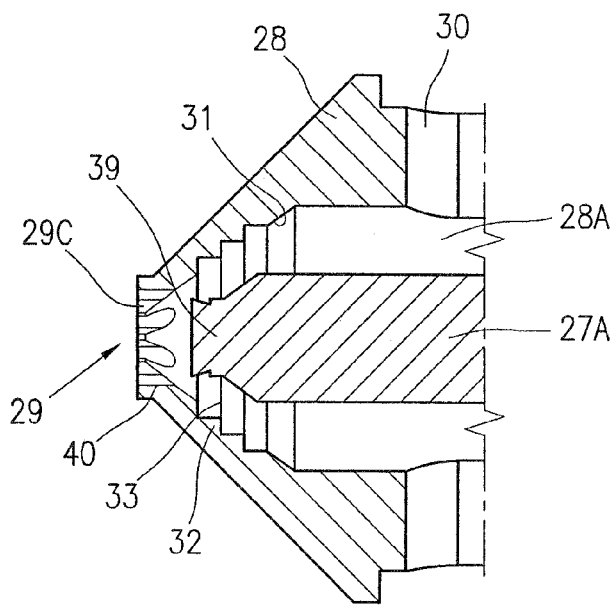
FIG. 10 shows an enlarged detail of the nozzle of FIG. 8.
Figure 11:
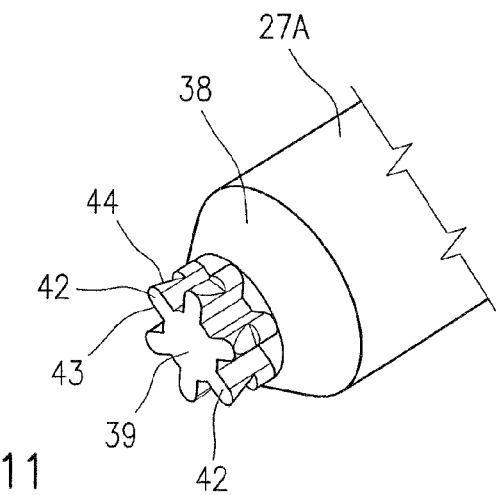
FIG. 11 shows an enlarged perspective view of the fore side of the plug member for adjusting the pressure drop.

The embodiment of FIG. 8, as shown in the enlarged detail of FIG. 9 and of FIG. 11, differs from the preceding solution in that now the tip 39 of the needle 27 for controlling the pressure drop in turn has a lobed shape which adapts to the lobed shape of the hole 29 of the nozzle 28, to form a narrowed orifice of corresponding shape.

In particular, the tip 39 has a plurality of radial lobe ribs 42, which extend longitudinally from the conical surface of the end portion 38, ending with sharp radial edges 43 for shearing the flow, in correspondence with the front surface.

Moreover, as from FIG. 11, each lobed rib 42 has sharp longitudinal shearing edges 44 provided by flat surfaces rearwardly slanting towards the longitudinal axis of the needle 27, so as to more greatly increase the shearing action into the nappe of the fluid flow and its turbulence and/or vorticity condition.

Unlike the case of FIG. 3, the needle 27 for controlling the pressure drop of the injector of FIG. 8, has a lobed tip 39 whose lobed ribs 42 must remain aligned with the lobes 29B of the lobed hole 29 of the nozzle 28. Consequently, to allow the axial adjustment of the needle 27 it is necessary to ensure that the latter can slide axially, preventing the rotation.

In this connection, the needle 27 has a through slot 45, which axially extends for a length equivalent to the allowed adjusting stroke; a stop pin 46 passes diametrically through the slot 45 and screws into the casing 26 of the injector to prevent the rotation of the needle 27, while allowing it to axially slide. A rear control portion 27B for the needle 27 is connected to the latter with the possibility of free rotation around the longitudinal axis of the same plug.

In this connection, the needle 27 is provided with a rear shank 47 having a cylindrical head 48 housed in a cylindrical seat 49 at the corresponding end of the rear portion 27B. In place of the slot 45 in the pin 46, the head 48 and the cylindrical slot 49, it is possible use other operative control means, capable of allowing the axial sliding movement of the needle 27, while preventing rotation.

The figures from 12 to 15 show a third embodiment of the injector, which differs from the previous ones substantially due to the hollow shape of the needle 27 for controlling the pressure drop. In these figures the same reference numbers as the previous figures have again been used, to indicate similar or equivalent parts.

The embodiment of FIG. 12 has been studied to more greatly increase the shearing action in the flow inside the aforesaid needle 27 which, together with the hole 29 of the nozzle 28 again contributes to form a narrowed lobe-shaped orifice for the fluid which flows through it.

In the case of FIG. 12, the injector 20 has a hollow body 26 with a modified shape compared to the preceding examples, in which the nozzle 28 is made separately and screwed or tightly fitted into the fore end of the casing 26 of the injector.

Also in this case, the nozzle 28 has a conical internal surface preferably shaped with a plurality of annular steps 32, with circular-shaped sharp edges 33, which ends in an ejection hole 29 in turn having a conical surface.

The injector 20 again comprises a needle 27 for controlling the pressure drop, connected to a rear control portion 27B; however, in this case the needle 27 has a hollow-shaped fore tubular portion 27A to allow both the passage of the fluid through the plug, and an adjusting action of the lobed section.

More precisely, the fore portion 27A of the needle 27 is in the form of a tubular element which screws onto a threaded shank of the rear control portion 27B.

The needle 27 again penetrates into an annular chamber 28A for distribution of the fluid, provided with inlet apertures 30. The chamber 28A communicates with the inside of the hollow needle 27 through inlet apertures 50.

The tubular portion 27A of the needle 27, at its fore end has a conical head 51 comprising a plurality of longitudinally extending tongues 52, six in the case shown, having a triangular cross section; longitudinal slits 54 make the tongues 52 elastically yielding in a radial direction.

The tongues 52 are shaped with a conical outer surface differently tapering in respect to the internal conical surface of the nozzle 28; the conical internal surface in its simplest form can be smooth, as shown further on, or can have a plurality of transversal teeth with sharp edges 53 for shearing into the nappe of the fluid flow.

The presence of the elastically yielding longitudinal tongues 52, separated by longitudinal slits 54 delimited by flat side surfaces 55 parallel to radial planes, together with the conical inner surface of the nozzle 28, again contribute to form an orifice for the ejection of the fluid having an adjustable lobed narrowing cross-sectional area, as shown in FIG. 13.

The lobed shape of the ejection section determines, in the fluid jet, an increase in the perimeter of the interface between the jet and surrounding surfaces in the narrowed section, to induce further vorticity and turbulence in the jet.

The jet thus proves to be characterised by a different evolution compared to that of a jet caused by a cylindrical injector in particular, in the case of a lobed injector according to the invention, the jet comprises a region for the formation of vortices or eddies which, moving downstream of the injector, intensify and cause the explosion of an azimuthal vortex characterised by turbulent structures of smaller dimensions, but of high intensity.

Due to the possibility of adjusting the axial position of the lobed head 51 of the needle 27, with respect to the hole 29 of the nozzle, as well as the radial flexibility of the tongues 52 when they are urged into contact with the conical inner surface of the hole 29, it is possible to change the cross sectional area of the ejection orifice while still maintaining its lobed shape, as in the previous cases.

Moreover, the substantially triangular-shaped tongues 52, and the internal toothing 53 have sharp edges for shearing into the fluid, which extend longitudinally and/or transversally to the axis of the nozzle, again increasing the contact surface area with the fluid and the turbulence of the jet.

Figures from 16 to 19 show a fourth embodiment of an injector according to the invention, having characteristics similar to that of FIG. 12; therefore the same reference numbers have been used for similar or equivalent parts.

The injector according to the example of FIG. 16, differs from the injector of FIG. 12 in several parts of the nozzle 28 and the head 51 of the needle 27 for controlling the pressure drop; once again an operative connection is provided between the fore tubular portion 27A of the needle 27 and the rear control portion 27B, of such kind as to allow an axial sliding, preventing any rotation of the lobed head 51 in a way similar to the example of FIG. 8.

From the figures from 16 to 19 it can be seen that in this fourth case the nozzle 28 has an inner surface 31 which again ends in a lobe-shaped hole 29, similarly to the example of FIG. 4; however, in this case the hole 29 has sharp edges 56 which extend parallel to the axis of the hole, in the longitudinal direction of the jet, as well as sharp edges 57 along slanting planes on both sides of each triangular tooth 29C.

The flexible tongues 52 of the head 51 and the lobes 29B of the hole 29 of the nozzle are again aligned with one another, in the same way as the example of FIG. 8. Consequently, also in this case an elongated slot 45 and a stop pin 46 are provided, as well as an operative connection 48, 49 between the intermediate axial guide portion 27C for axially guiding the needle 27, and the rear control portion 27B. Lastly, the tongues 52 comprise a fore portion 52A having a greater tapering, with the lateral edges converging forward, so as to further increase their flexibility, thereby enabling a fine adjustment of the pressure drop.

The figures from 20 to 23 show a fifth embodiment, comparable to that of figures from 12 to 15; therefore the same reference numbers have been again used to indicate similar or equivalent parts.

The solution of figures from 20 to 23 differs from the previous one in that the hole 29 of the nozzle 28 and the flexible tongues 52 of the plug for controlling the pressure drop have smooth inner surfaces, while maintaining the characteristic lobed shape and the presence of sharp longitudinal edges along the individual tongues 52.

According to the invention, a method and a high-pressure mixing apparatus are provided, which are particularly suitable for mixing reactive chemical components, in the manufacture of polyurethane foams, bi-component resins and molded articles, which make use of a special adjustable injector, provided with lobate formations capable of generating a fluid flow whose turbulence is intensively increased both by a lobed shape of the narrowed cross-sectional area of the ejection orifice, and by the possible flowing of the fluid over sharp edges along a flow path towards a narrowed cross-sectional ejection area, in which the turbulence state is transferred into the jets which are impinging in a mixing chamber. Due to the presence of an axially movable plug for controlling the pressure drop, in combination with the lobed configuration of the injection nozzle, it is also possible to adequately adjust the narrowed section for ejection of the flow, so as to achieve a sufficient pressure drop for a turbulent mixing, in relation to the stoichiometric volumes required by the process.

It is understood that what has been described and shown in the accompanying drawings has been given purely by way of example, to illustrate several preferential embodiments, and to illustrate the general features of the method according to the invention.

Therefore, other modifications or changes may be made to the injector and the parts thereof, without thereby departing from the claims.

I claim:

1. A method for high-pressure mixing of chemically reactive fluid components, suitable for the manufacture of polyurethane resins, bi-component resins and molded articles, comprising:

pressure feeding flow-rates of a first and at least a second fluid component to a respective injection device comprising an injection nozzle and a control needle for controlling a pressure drop of the fluid, said injection nozzle and said needle having facing surfaces to contact the fluid narrowing towards an orifice for the discharge of a fluid jet;

injecting the fluid jet of each component into a mixing chamber of a mixing device where the chemical components are thoroughly mixed by turbulence and impingement, conforming the injection nozzle and/or the needle to provide a lobed orifice for the discharge of the fluid jet;

adjusting the operative position of the needle with respect to the injection nozzle, to provide a lobed outlet orifice having a narrowing cross-sectional area related to the flow-rate of the chemical component, to cause a pre-established pressure drop in the jet; and generating a swirling and highly turbulent condition in the fluid jet, shaping the jet with a plurality of radial lobate formations as it flows through said lobed outlet orifice.

2. The method according to claim 1, comprising the step of shaping a lobed jet by providing the fluid-contact surfaces of the injection nozzle and/or of the needle for controlling the pressure drop, with a plurality of lobes extending in radial and in longitudinal directions of nozzle.

3. The method according to claim 1, comprising the step of:
shaping a lobed fluid jet by flowing the fluid chemical component against smooth fluid-contact surfaces of the nozzle and/or the needle.

4. The method according to claim 1, comprising the step of:
shaping a lobed jet by flowing the fluid chemical component against fluid contact surfaces of the nozzle and/or the needle having a plurality of sharp edges; and generating an additional and highly turbulent whirling state in the fluid by said plurality of sharp edges.

5. An apparatus for the high-pressure mixing of chemically reactive fluid components, according to the method of claim 1, comprising:

the mixing chamber;

first and at least second injectors for feeding the chemical components into said mixing chamber;

in which at least one of the injectors comprises a hollow body and the nozzle opening into the mixing chamber and defining a flow path for the fluid between an inlet and an outlet hole; and the axially movable needle for controlling the pressure drop of the fluid, said nozzle and said plug member having fluid-contact surfaces narrowing towards an outlet hole of the nozzle, wherein said fluid-contact surfaces of the nozzle and the needle are conformed to provide the lobed orifice at the outlet hole, comprising a central zone and a plurality of lobes which radially extend from said central zone.

6. The apparatus according to claim 5, wherein said nozzle and/or said, needle have smooth fluid-contact surfaces.

7. The apparatus according to claim 5, wherein the fluid-contact surface of the nozzle and/or of the needle have a plurality of sharp edges.

8. The apparatus according to claim 7, wherein the sharp edges are oriented in a direction parallel to a longitudinal axis of the injector.

9. The apparatus according to claim 7, wherein the sharp edges are oriented in a crosswise direction to a longitudinal axis of the injector.

10. The apparatus according to claim 7, wherein sharp edges are oriented in directions both parallel and crosswise to a longitudinal axis of the injector.

11. The apparatus according to claim 5, wherein the hollow body of the injector and the needle for controlling the pressure drop provide an annular chamber at the fore end of the plug;

in that the plug has a hollow fore portion in fluid communication with said annular chamber; and in that the hollow fore portion of the needle is conformed with a plurality of elastically yielding tongues which extend along a longitudinal axis of the injector.

12. An injector for feeding a chemically reactive fluid component into a mixing chamber of a mixing device, for the manufacture of polyurethane resins, bi-component resins and molded articles, comprising:

a hollow body defining a flow path between a fluid inlet and an outlet hole of an injection nozzle;

an axially movable needle coaxially extending in the injection nozzle for controlling the pressure drop, said nozzle and said needle having facing surfaces to contact the fluid which narrow towards the outlet hole, wherein the nozzle and/or the needle are conformed to provide a lobed outlet orifice comprising a narrowing cross-sectional outlet area having a central zone and a plurality of peripheral lobes, radially extending from the central area of the lobed orifice.

13. The injector as claimed in claim 12, wherein said plurality of lobes extend in a radial and in a longitudinal direction of the outlet orifice of the nozzle.

14. The injector according to claim 12, wherein the fluid-contact surfaces of the lobed injection nozzle, and the needle comprise a plurality of lobes and ribs which extend in an axial direction, and means for adjusting the axial position of the plug member, as well as means to maintain the ribs of the needle radially aligned with the lobes of the injection nozzle.

15. The injector according to claim 12, wherein the injection nozzle and/or the needle have smooth fluid-contact surfaces.

16. The injector according to claim 12, wherein the fluid-contact surfaces of the nozzle and/or of the needle, comprise a plurality of sharp edges.

17. The injector according to claim 16 wherein the sharp edges are oriented longitudinally and/or transversally to the flowing direction of the fluid.

18. The injector according to claim 12, wherein the nozzle has a lobed outlet hole, and in that the needle has a conically diverging fore portion, which axially extends into the lobed hole of the nozzle.

19. An injector for feeding a chemically reactive fluid component into a mixing chamber of a mixing device, for the manufacture of polyurethane resins, bi-component resins and molded articles, comprising:

a hollow body defining a flow path between a fluid inlet and an outlet hole of an injection nozzle;

an axially movable needle coaxially extending in the injection nozzle for controlling the pressure drop, said nozzle and said needle having facing surfaces to contact the fluid which narrow towards the outlet hole, wherein the nozzle and/or the needle are conformed to provide a lobed outlet orifice comprising a narrowing cross-sectional area having a central zone and a plurality of peripheral lobs, radially extending from the central area of the lobed orifice wherein the fore end of the needle comprises a plurality of elastically yielding longitudinal tongues, extending into the nozzle of the injector, the tongues of the needle in combination with the inner surface of the injection nozzle, defining radially extending slits of the lobed orifice, and manually actuable control means conformed to change the axial position of the needle with respect to the injection nozzle.

20. The injector according to claim 19 wherein the flexible tongues have a triangular cross section, providing sharp edges.

21. The injector according to claim 19, wherein the tongues comprise flat side surfaces, each oriented parallel to a respective radial plane.

22. The injector according to claim 19, wherein the tongues are slanted towards a longitudinal axis of the injector and converge in the flowing direction of the fluid.

23. The injector according to claim 19, wherein the injection nozzle and the tongues of the plug member have smooth fluid-contact surfaces.

24. The injector as claimed in claim 19, wherein the nozzle has a lobe-shaped outlet hole having a number of radial lobes; in that the needle at the fore end has a number of radial ribs corresponding to the lobes of the nozzle; and comprises manually operable control means to the axially slide the needle, to change the cross sectional area of the lobed outlet hole while maintaining the ribs of the needle aligned to the lobes of the nozzle.

* * * * *